United States Patent [19]
Iida et al.

[11] Patent Number: 5,998,553
[45] Date of Patent: Dec. 7, 1999

[54] HIGHLY WATER-ABSORPTIVE POLYMER AND PROCESS FOR PRODUCING THE SAME

[75] Inventors: Seiichiro Iida; Kiichi Ito; Sueichi Kato, all of Yokkaichi, Japan

[73] Assignee: Mitsubishi Chemical Corporation, Tokyo-To, Japan

[21] Appl. No.: 09/064,167

[22] Filed: Apr. 22, 1998

[30] Foreign Application Priority Data

Apr. 22, 1997 [JP] Japan ................... 9-118853

[51] Int. Cl.⁶ .................. C08F 2/00
[52] U.S. Cl. ......................... 526/193
[58] Field of Search ................ 526/193

[56] References Cited

FOREIGN PATENT DOCUMENTS

| | | |
|---|---|---|
| 0 349 240 | 1/1990 | European Pat. Off. . |
| 0 594 009 | 4/1994 | European Pat. Off. . |
| 0 695 762 | 2/1996 | European Pat. Off. . |
| 60-258213 | 12/1985 | Japan ................ 526/193 |
| 4-36304 | 2/1992 | Japan ................ 526/193 |

*Primary Examiner*—Bernard Lipman
*Assistant Examiner*—N. Sarofim

*Attorney, Agent, or Firm*—Oblon, Spivak, McClelland, Maier & Neustadt, P.C.

[57] ABSTRACT

A process for producing a highly water-absorptive polymer, which comprises suspending an aqueous solution containing a water-soluble polymerizable monomer and an optional crosslinking agent into droplets in a hydrophobic organic solvent in the presence of a dispersant and a water-soluble radical polymerization initiator, and allowing the water-soluble polymerizable monomer to polymerize in the droplets, wherein the dispersant is a phosphoric ester surface active agent represented by the following general formula [I]:

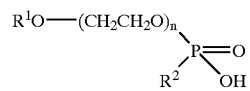

[I]

wherein $R^1$ represents an alkyl or alkylaryl group having 8 to 30 carbon atoms, $R^2$ represents OH group or a group of the formula $—(CH_2CH_2O)_m—OR^1$, and m and n are an integer of 1 to 30, and the aqueous solution is successively fed to the hydrophobic organic solvent so that the droplets of different polymerization degrees can be present in the solvent.

4 Claims, 2 Drawing Sheets

HIGHLY WATER-ABSORPTIVE POLYMER AND PROCESS FOR PRODUCING THE SAME

BACKGROUND OF THE INVENTION

1. Field of the Invention

The present invention relates to novel highly water-absorptive polymer particles (hereinafter sometimes simply referred to as "highly water-absorptive polymer"), and to a process for producing the same. More specifically, the present invention relates to a non-spherical highly water-absorptive polymer having an average particle size and a bulk density both in specific ranges, and a narrow particle size distribution, which is excellent in the speed of water absorption and in the retention of water-absorbed gel, and is useful for sanitary goods; and to a process for producing such highly water-absorptive polymer, in which reverse-phase suspension polymerization is carried out in a specific manner.

2. Background Art

In recent years, highly water-absorptive polymers have come to be used not only for sanitary goods such as paper diapers and sanitary napkins, but also in the industrial fields of water-stopping materials, dew-condensation-preventing materials, freshness-retaining materials, desolvating/dehydrating materials and the like, for afforestation, and for agriculture and horticulture; and a variety of highly water-absorptive polymers have been proposed so far, such as hydrolysates of starch-acrylonitrile graft copolymers, crosslinked carboxymethyl-cellulose, crosslinked polyacrylic acids (salts), acrylic acid (salt)-vinyl alcohol copolymers, crosslinked polyethylene oxides, and the like.

As a method for producing a highly water-absorptive polymer by the polymerization of a water-soluble polymerizable monomer, there is known a reverse-phase suspension polymerization method in which polymerization is carried out by suspending/dispersing a water-soluble polymerizable monomer in a hydrophobic organic solvent, and also an aqueous solution polymerization method. The particle characteristics, such as the shape and size of particles, of a highly water-absorptive polymer are greatly dependent upon the polymerization method employed.

In the case of aqueous solution polymerization, it is necessary to crush the polymer produced. The crushed polymer generally has a wide particle size distribution. Accordingly, it is usually necessary to take measures for preventing dusts of fine particles. Further, coarse particles must be re-crushed.

In reverse-phase suspension polymerization, polymerization is carried out by dispersing an aqueous solution of a water-soluble polymerizable monomer in a hydrophobic organic solvent, so that a dispersant is usually used. The dispersant can have a great influence on the particle characteristics, such as particle size and particle size distribution, of the resulting highly water-absorptive polymer, on the attendant properties such as water absorption properties and the gel retention, and on the stable industrial production of the highly water-absorptive polymer.

Thus, when a fatty acid ester of sorbitan, which has conventionally been employed in reverse-phase suspension polymerization, is used as a dispersant (Japanese Patent Publication No. 30710/1979), the resulting highly water-absorptive polymer has a small average particle size of not greater than 100 $\mu$m, and, in addition, a considerably wide particle size distribution. It is therefore necessary to take measures for preventing dusts upon handling of the polymer. Moreover, the polymer tends to be poor in the speed of water absorption and in the gel retention. For this reason, various methods have been proposed in order to increase the average particle size.

A typical method for increasing the average particle size is to add a thickening agent to the monomer phase (Japanese Patent Laid-Open Publication No. 191604/1990). This method, however, has the drawback that since the viscosity of the monomer phase is increased, the polymer particles tend to adhere to one another to entirely or partially form lumps.

Besides the above-described method, there have been proposed methods which utilize various other surface active agents for the purpose of increasing the average particle size.

For example, there has been proposed a method in which an oil-soluble cellulose ester or cellulose ether is used (Japanese Patent Publication No. 17482/1989, and Japanese Patent Laid-Open Publication No. 158210/1982). A polymer having an increased average particle size can be obtained by this method. However, the remaining dispersant melts while the polymer is dried, so that the polymer tends to agglomerate, or to adhere to reactor walls. For this reason, when industrial productivity is taken into consideration, it cannot be said that this method is advantageous.

When a monoalkyl phosphate having a linear alkyl group containing 12 to 24 carbon atoms is used (Japanese Patent Laid-Open Publication No. 209201/1986), a polymer having a large particle size can be obtained. However, this surface active agent is not highly soluble in an organic solvent, so that the allowable range of production conditions under which a polymer is stably produced is extremely narrow. When the polymerization is carried out under conditions not within an allowable range, bulk polymerization tends to take place. Therefore, this method is also disadvantageous when stable industrial production is taken into consideration.

A polyoxyethylene alkyl ether phosphate is highly soluble in an organic solvent, and the use thereof provides a polymer having a large particle size (Japanese Patent Laid-Open Publication No. 36304/1992). However, due to the use of one-feed polymerization, the allowable range of production conditions under which a polymer is stably produced is very narrow. When polymerization is carried out under conditions outside this range, bulk polymerization tends to take place. For this reason, this method is also disadvantageous from the viewpoint of stable industrial production.

Further, when a polyoxyethylene alkyl ether sulfate is used (Japanese Patent Laid-Open Publication No. 93008/1994), a polymer having a large particle size can surely be obtained. However, this dispersant is highly hydrophilic, so that the polymer remarkably adheres to the reactor wall during polymerization and dehydration. Therefore, this method is also disadvantageous when stable industrial production is taken into consideration.

As described above, the conventional highly water-absorptive polymers, produced either by aqueous solution polymerization or by reverse-phase suspension polymerization, have the aforementioned drawbacks in the particle characteristics, the performance upon use, and the industrial productivity.

The particle characteristics, e.g. shape of particle, of a highly water-absorptive polymer is closely related to the retention of the water-swollen gel of the polymer in a sanitary article such as a sanitary napkin or diaper, as described below.

A highly water absorptive polymer is incorporated as an absorbent in a sanitary article generally in the following monomer: a polymer is either sprinkled between cottony pulp layers or fully mixed with a cottony pulp; the resultant composite is placed on a substrate; and then wrapped with an air-permeable sheet to prepare the article.

In such an article, the use of the above-described crushed highly water-absorptive polymer with sharp edges and a wide particle size distribution, obtained via the aqueous solution polymerization, entails the following problems: those particles having large particle sizes break through the air-permeable sheet with their edges, and are forced out from the broken parts of the air-permeable sheet; and those particles having small particle sizes, or water-absorbed gels migrate in, or fall off the cottony pulp through the interstices therein.

In the case where a highly water-absorptive polymer obtained by the reverse-phase suspension method is used, if it is spherical and has a small average particle size, the polymer dispersed in the cottony pulp readily migrates or falls off. Even when the polymer has a large average particle size, there is still such a problem if the particle size distribution is wide that those polymer particles having small particle sizes migrate or fall off.

As described above, those highly water-absorptive polymers which are commonly used now are not satisfactory in the shape, size and size distribution of the particles, and in the performance upon use in sanitary goods.

SUMMARY OF THE INVENTION

An object of the present invention is to provide novel highly water-absorptive polymer particles and a process for producing the same, which overcome the above-described drawbacks in the prior art.

Thus, the present invention provides a process for producing a highly water-absorptive polymer, which comprises suspending an aqueous solution containing a water-soluble polymerizable monomer and an optional crosslinking agent into droplets in a hydrophobic organic solvent in the presence of a dispersant and a water-soluble radical polymerization initiator, and allowing the water-soluble polymerizable monomer to polymerize in the droplets, wherein the dispersant is a phosphoric ester surface active agent represented by the following general formula [I]:

wherein $R^1$ represents an alkyl or alkylaryl group having 8 to 30 carbon atoms, $R^2$ represents OH group or a group of the formula $—(CH_2CH_2O)_m—OR^1$, and m and n are an integer of 1 to 30,
and the aqueous solution is subsequently fed to the hydrophobic organic solvent so that the droplets of different polymerization degrees can be present in the solvent.

The present invention also provides a highly water-absorptive polymer comprising crosslinked non-spherical polymer particles, the polymer particles comprising the monomer unit of acrylic acid and/or an alkaline metal salt thereof, and having an average particle size of 300 to 1,000 μm and a bulk density of 0.3 to 0.9 g/ml, the logarithmic standard deviation of the particle sizes of the polymer particles being 0.35 or less.

According to the present invention, a highly water-absorptive polymer having the above-described particle characteristics, which cannot be obtained by any conventional polymerization process, can be produced at a low cost in a simple manner due to the use of the specific phosphate surface active agent and the successive monomer feed in carrying out reverse-phase suspension polymerization. The highly water-absorptive polymer of the present invention is especially suited for use in sanitary articles such as paper diapers and sanitary napkins.

DETAILED DESCRIPTION OF THE INVENTION

General Explanation

The highly water-absorptive polymer of the present invention is, unlike a spherical polymer obtainable by a conventional reverse-phase suspension polymerization method, in the form of agglomerates in which primary particles having particle sizes of 5 to 100 μm are integrated by fusion. The highly water-absorptive polymer has a large average particle (agglomerate) size of 300 to 1,000 μm and a narrow particle size distribution, whereby it is considerably improved in the speed of water absorption. Moreover, the polymer is almost free from fine particles of 100 μm or smaller, which can be a cause of dust disaster or the like.

Further, unlike a highly water-absorptive polymer granulated with a binder, primary particles existing at the center of the agglomerate are completely fused and perfectly integrated, whereby water-absorbed gels never return to primary particles. The polymer of the present invention is thus greatly improved also in the retention of water-absorbed gel in a sanitary article.

According to the present invention, by carrying out polymerization by the use of the above-described specific surface active agent as a dispersant, it is firstly possible to produce a highly water-absorptive polymer having a large particle size without suffering from the remarkable adhesion of the polymer to reactor walls. On the other hand, according to the polymerization process described in Japanese Patent Laid-Open Publication No. 93008/1994, a sulfonate surface active agent which is more hydrophilic than the surface active agent for use in the present invention is used, so that the polymer adheres remarkably to the reactor wall during polymerization and dehydration.

Secondary, since the polymer does not so remarkably adhere to reactor walls and the like, it is possible to widely change the production conditions. On the other hand, although a highly water-absorptive polymer having a large particle size can be obtained when the surface active agent described in Japanese Patent Laid-Open Publication No. 209201/1986 is used, there is an upper limit to the amount of a water-soluble polymerizable monomer to be used for polymerization. When the monomer is added in an amount larger than the upper limit, bulk polymerization can take place. Thus, the allowable range of polymerization conditions under which a polymer is stably produced is narrow.

Further, the present invention can be carried out stably and efficiently by conducting polymerization by successively feeding an aqueous solution of a water-soluble polymerizable monomer (this polymerization method is herein sometimes referred to as "dropping polymerization method"). On the other hand, the technique described in Japanese Patent Laid-Open Publication No. 36304/1992 adopts a polymerization method in which an aqueous solution of a water-soluble polymerizable monomer is added at one time to an organic solvent at a low temperature, and the temperature of the reactor is then raised (this polymerization method is herein sometimes referred to as "one-feed polymerization method"). In this method, it is necessary to carry out polymerization with a small amount of monomer under high-speed stirring conditions in order to surely obtain a polymer having a large average particle size. This prior art method is thus unsatisfactory in production efficiency.

Water-Soluble Polymer Monomer

As a water-soluble polymerizable monomer for use in the present invention, any monomer can be used as long as it can provide a highly water-absorptive polymer according to the polymerization method of the present invention. Examples of preferable water-soluble polymerizable monomers include (a) ionic monomers, for instance, (meth)acrylic acid and alkaline metal or ammonium salts thereof, and 2-acrylamide-2-methylsulfonates and/or alkaline metal salts thereof, (b) nonionic monomers, for instance, (meth)acrylamide, N,N-dimethylacrylamide, 2-hydroxyethyl (meth)acrylate and N-methylol(meth)acrylamide, and (c) amino-group-containing polymerizable monomers and quaternized compounds thereof, for instance, diethylaminoethyl (meth)acrylate and dimethylaminopropyl(meth)acrylate. In the present invention, one, or two or more monomers selected from these groups can be used as the water-soluble polymerizable monomer. It is noted that the term "(meth) acryl" as used herein means both "acryl" and "methacryl".

Among the above-enumerated monomers, particularly preferred are (meth)acrylic acid and/or alkaline metal or ammonium salts thereof, (meth)acrylamide, and the like. As the alkaline metal salts, there can be mentioned sodium salts, potassium salts, lithium salts, rubidium salts, and the like. However, sodium salts and potassium salts are preferred from the viewpoints of the properties of the resulting polymer, industrial availability, and safety.

The concentration of the water-soluble polymerizable monomer in the aqueous solution is generally 20% by weight or more, preferably from 25% by weight to the saturation point. Further, such a monomer as (meth)acrylic acid or 2-methylacrylamide-2-sulfonate is often used in such a form that a part of or all of the amount of the monomer to be used is neutralized with an alkaline metal or ammonium compound, that is, in the form of salt. In this case, the degree of neutralization is generally from 20 to 100 mol %, preferably from 30 to 100 mol % of the total amount of the monomer to be used.

Crosslinking Agent

The above-described water-soluble polymerizable monomers, especially acrylic acid monomers, can give highly water-absorptive polymers even if any crosslinking agent is not used because they are self-crosslinked to some extent. However, in order to obtain well-balanced water-absorption properties, it is preferable to add a crosslinking agent to the aqueous monomer solution. Examples of crosslinking agents which can be used in the present invention include those ones having two or more polymerizable unsaturated groups and/or reactive functional groups.

Thus, methods of crossliking can be roughly classified into two: a method in which crosslinked structure is introduced by copolymerizing monomer compounds having two or more polymerizable unsaturated groups; and a method in which crosslinked structure is formed by reacting a water-soluble monomer with a compound containing two or more functional groups, such as glycidyl group, reactive with those functional groups, such as carboxyl group, which are present in the water-soluble monomer either before or after the polymerization thereof. In the latter case, if the monomer containing the functional groups reacts with the compound containing the functional groups before the monomer is polymerized, monomer compounds containing two or more polymerizable unsaturated groups are formed before polymerization, and these monomers are then copolymerized. The latter method is thus substantially the same as the former one. Therefore, in the present invention, it is unnecessary to make a distinction between these two methods.

Examples of crosslinking agents having two or more polymerizable unsaturated groups include (a) di- or tri(meth) acrylic esters of polyols, for example, those ones in which the polyol is ethylene glycol, propylene glycol, trimethylol propane, glycerin, polyoxyethylene glycol, polyoxypropylene glycol, polyglycerin or the like, (b) unsaturated acid esters of polyols in which the unsaturated acid is other than (meth)acrylic acid, for example, maleic acid or fumaric acid, (c) bisacrylamides, for example, N,N'-methylene bisacrylamide, (d) di- or tri(meth)acrylic esters obtainable by reacting polyepoxides with (meth)acrylic acid, (e) di(meth)acrylic carbamyl esters obtainable by reacting polyisocyanates with (meth)acrylic hydroxyesters, for example, those ones in which the polyisocyanate is tolylene diisocyanate, hexamethylene diisocyanate, or the like, (f) polyvalent allyls, for example, allylated starch, allylated cellulose, diallyl phthalate, tetraallyloxyethane, pentaerythritol triallyl ether, trimethylol propane triallyl ether, diethylene glycol diallyl ether and triallyl trimellitate. Of these, ethylene glycol di(meth)acrylate, propylene glycol di(meth) acrylate, polypropylene glycol di(meth)acrylate, N,N'-methylene bis(meth)acrylamide and the like are preferable for use in the present invention.

Examples of crosslinking agents having two or more functional groups reactive with those functional groups such as carboxyl group which are contained in a monomer to be used for producing a highly water-absorptive polymer include diglycidyl ether compounds, haloepoxy compounds, and isocyanate compounds. Of these, diglycidyl ether compounds are particularly preferred. Specific examples of diglycidyl ether compounds include ethylene glycol diglycidyl ether, polyethylene glycol diglycidyl ether, propylene glycol diglycidyl ether, polypropylene glycol diglycidyl ether, glycerin diglycidyl ether, and polyglycerin diglycidyl ether. Of these, ethylene glycol diglycidyl ether is preferred. Other crossliking agents which can be used in the present invention include haloepoxy compounds such as epichlorohydrin and β-methyl epichlorohydrin, and isocyanate compounds such as 2,4-tolylene diisocyanate and hexamethylene diisocyanate. These crosslinking agents are usually used to form crosslinked structure by reacting them with the polymers. However, as mentioned previously, it is also possible to react these crosslinking agents with the monomers before the polymerization, thereby forming crosslinking agents having two or more polymerizable unsaturated groups.

The amount of the crosslinking agent to be used is generally from 0 to 10% by weight, preferably from 0 to 5% by weight of the water-soluble polymerizable monomer.

Water-Soluble Radical Polymerization Initiator

The polymerization initiator for use in the present invention is a water-soluble radical polymerization initiator. Examples of such initiators include (a) hydrogen peroxide, (b) persulfates such as potassium persulfate, sodium persulfate and ammonium persulfate, and (c) azo initiators such as 2,2'-azobis(2-amidinopropane) dihydrochloride, 2,2'-azobis (N,N'-dimethyleneisobutylami dine) dihydrochloride, and 2,2'-azobis{2-methyl-N-[1,1-b is(hydroxymethyl)-2-hydroxyethyl]propionamide}. These water-soluble radical polymerization initiators can be used singly. Alternatively, a mixture of two or more initiators selected from one of, or two or more of the above groups can also be used. Further, a combination of hydrogen peroxide or a persulfate with a reductive substance such as a sulfite or L-ascorbic acid, or an amine salt can also be used as a redox initiator. It is suitable that the polymerization initiator be used generally in an amount of 0.001 to 5% by weight, preferably 0.01 to 1% by weight of the water-soluble polymerizable monomer.

Hydrophobic Organic Solvent

As the hydrophobic organic solvent for use in the present invention, any organic solvent can be used as long as it is insoluble in water and inert to polymerization. Specific examples of preferable hydrophobic solvents include (a) aliphatic hydrocarbons, for example, n-pentane, n-hexane, n-heptane and n-octane, (b) alicyclic hydrocarbons, for example, cyclohexane and methylcyclohexane, and (c) aromatic hydrocarbons, for example, benzene, toluene and xylene. n-Hexane, n-heptane and cyclohexane are preferred from the viewpoints of stable industrial availability and quality.

The hydrophobic organic solvent is used generally in an amount 0.5 to 10 times, preferably 0.5 to 3 times the weight of the water-soluble polymerizable monomer.

Dispersant

The phosphoric ester surface active agent which is used in the present invention as a dispersant, that is, an auxiliary useful for dispersing the aqueous monomer solution into droplets in the hydrophobic organic solvent, is represented by the following general formula [I]:

[I]

wherein $R^1$ represents an alkyl or alkylaryl group having 8 to 30 carbon atoms, $R^2$ represents OH group or a group of the formula $-(CH_2CH_2O)_m-OR^1$, and m and n are an integer of 1 to 30. These phosphoric ester surface active agents are similar to natural phospholipids (lecithin, cephalin, etc.) in both chemical structure and physiological properties. Therefore, they are not so toxic and irritative as other surface active agents, and thus favorable from the viewpoint of safety.

In the above formula [I], R is preferably an alkyl or monoalkylphenyl group having 8 to 23 carbon atoms (the number of carbon atoms contained in the alkyl group in a monoalkylphenyl group being from 2 to 17), and an alkyl group is particularly preferred. m and n are preferably an integer of 1 to 20. When this phosphoric ester is a diester, $R^2$ is preferably $R^1O-(CH_2CH_2O)_n-$, i.e. the same polyoxyethylene ether containing $R^1$ as the above.

The amount of the dispersant to be used varies depending on the type of the monomer used and on the other operation conditions. However, it is generally from 0.01 to 5% by weight, preferably from 0.05 to 2% by weight of the weight of the hydrophobic organic solvent. When the dispersant is used in an amount less than 0.01% by weight, the desired dispersing effect cannot be obtained. On the other hand, when the dispersant is used in an amount more than 5.0% by weight, the resulting polymer undesirably tends to agglomerate while it is dried after polymerization.

Examples of typical and preferable phosphoric esters include polyoxyethylene nonylphenyl ether phosphate, polyoxyethylene octylphenyl ether phosphate, polyoxyethylene tridecyl ether phosphate, polyoxyethylene lauryl ether phosphate, polyoxyethylene dinonylphenyl ether phosphate, polyoxyethylene-Dobanol 25-phosphoric acid, polyoxyethylene-2-ethylhexyl ether phosphate, polyoxyethylene distyrenated phenyl ether phosphate, polyoxyethylene octadecyl ether phosphate, polyoxyethylene octadodecyl ether phosphate, and polyoxyethylene dodecyphenyl ether phosphate.

These phosphoric esters are usually marketed as mixtures of phosphoric monoesters and phosphoric diesters. Any weight ratio of monoester/diester can be used as long as the phosphoric ester does not adversely affect the reaction.

Polymerization/Polymerization Product

The polymerization process of the present invention comprises suspending an aqueous solution containing a water-soluble polymerizable monomer, and, if necessary, a crosslinking agent into droplets in a hydrophobic organic solvent in the presence of a dispersant and a water-soluble radical polymerization initiator, and allowing the water-soluble polymerizable monomer to polymerize in the droplets, wherein the dispersant is a phosphoric ester surface active agent represented by the above-described general formula [I], and the aqueous solution is successively fed to the polymerization reaction system so that the droplets of different polymerization degrees can be present in the hydrophobic organic solvent. The process is preferably conducted under reflux.

Specific methods for successively feeding a water-soluble polymerizable monomer to the polymerization reaction system include the following methods (1) to (4):

(1) a method in which an aqueous solution of a water-soluble polymerizable monomer is continuously added dropwise to a hydrophobic organic solvent, thereby successively polymerizing the monomer (continuous dropping polymerization method);

(2) a method in which an aqueous solution of a water-soluble polymerizable monomer is intermittently added dropwise to a hydrophobic organic solvent, thereby successively polymerizing the monomer (intermittent dropping polymerization method);

(3) a method in which an aqueous solution of a water-soluble polymerizable monomer is previously mixed with or dispersed in a part of a hydrophobic organic solvent to obtain a mixture or dispersion, and this mixture or dispersion is added dropwise to the remainder of hydrophobic organic solvent to polymerize the monomer (pre-dispersion method); and (4) a method which is a combination of the above methods (1) to (3).

There is no particular limitation on the method for adding the water-soluble radical initiator. It is however preferable that the radical initiator be added, in advance, to the aqueous solution of a water-soluble polymerizable monomer.

It is preferable that the polymerization be carried out at a temperature of from 40 to 150° C., more preferably from 60 to 90° C. When the polymerization temperature is too high, the degree of crosslinking is likely to become too high. The resulting polymer therefore shows poor water absorption capacity. On the other hand, when the polymerization temperature is too low, the rate of polymerization is significantly lowered. In addition, it is necessary to make an induction period extremely long. Unexpected polymerization tends to be induced during this period, and lumps are likely to form.

If the reverse-phase suspension polymerization is carried out by a one-feed polymerization method in which the aqueous solution of a water-soluble polymerizable monomer is fed to the hydrophobic organic solvent at one time, and the monomer is then polymerized, the allowable range of production conditions under which a water-absorptive polymer having a desired average particle size is produced becomes extremely narrow. When this polymerization method is effected under the same conditions as in the dropping polymerization method, it may be difficult to remove the heat generated during polymerization, and lumps are likely to form.

The following methods (1) to (3) can be mentioned as methods for allowing the phosphoric ester surface active agent to exist as a dispersant in the polymerization system:

(1) a method in which the surface active agent is dispersed in a hydrophobic organic solvent in advance;

(2) a method in which the surface active agent is gradually added while the above-described polymerization is carried out; and (3) a method which is a combination of the above methods (1) and (2).

According to the process of the present invention, it is possible to obtain a non-spherical highly water-absorptive polymer having an average particle size of 300 to 1,000 μm, preferably 300 to 800 μm, and a bulk density of 0.3 to 0.9 g/ml, preferably 0.4 to 0.7 g/ml, the logarithmic standard deviation (A) of the particle sizes of the polymer being 0.35 or less, preferably 0.30 or less.

Figure 1:
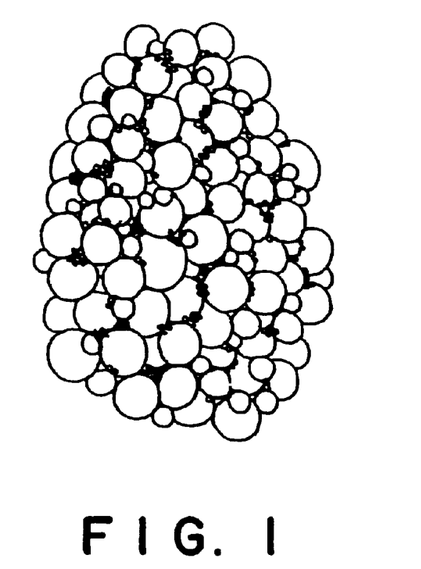
FIG. 1 is a schematic illustration showing a botryoidal highly water-absorptive polymer according to the present invention.
Figure 2:
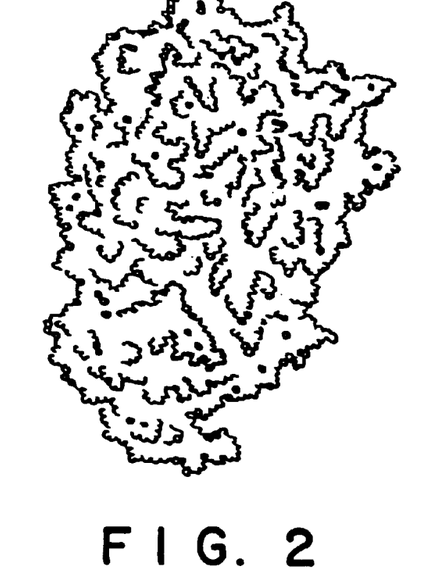
FIG. 2 is a schematic illustration showing a rock-like highly water-absorptive polymer according to the present invention.
Figure 3:
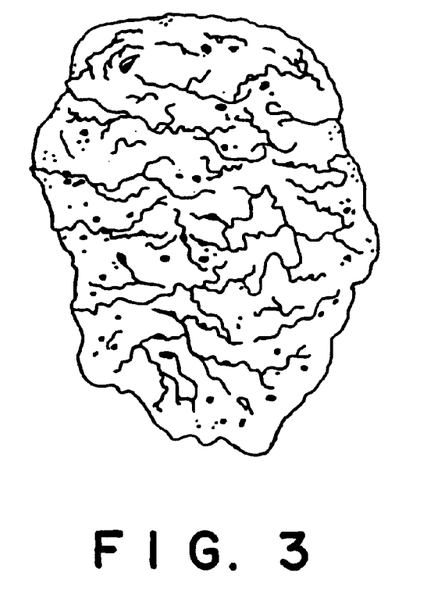
FIG. 3 is a schematic illustration showing a rice-grain-like highly water-absorptive polymer according to the present invention.

It is possible to change the shape of the non-spherical highly water-absorptive polymer to be produced by changing the type of the dispersant to be used, the number of revolutions for stirring during polymerization, the amount of the polymerization initiator to be used, or the like. Typical shapes of the highly water-absorptive polymers are as shown in FIGS. 1 to 3. FIG. 1 shows a botryoidal polymer having a low bulk density, in which primary particles of 5 to 100 μm are agglomerated into a greater particle. FIG. 3 shows a rice-grain-like polymer having a high bulk density, in which the presence of primary particles cannot be ascertained from the external appearance of the polymer. FIG. 2 shows a rock-like polymer, the shape thereof lying between the shape of the polymer shown in FIG. 1 and that of the polymer shown in FIG. 3. All of the polymers shown in FIGS. 1 to 3 have very narrow particle (agglomerate) size distributions irrespective of the shapes of the particles. Thus, it is possible to obtain a polymer having such a narrow particle size distribution that the logarithmic standard deviation (A), which is an index of the width of particle size distribution, obtained by plotting the particle size distribution on logarithmico-normal probability paper is 0.35 or less, preferably 0.30 or less. Such a narrow particle size distribution was not able to be attained by any conventional method.

One of the characteristic features of the present invention is that, since the polymer is produced by using the phosphoric ester surface active agent, the polymer contains phosphorus atoms on its surface and inside it. The phosphorus content of the polymer varies depending upon the type and amount of the surface active agent used. However, it is generally from 0.001 to 1%, preferably from 0.01 to 0.1% of the dried polymer.

As is well known, when a lipophilic, nonionic surface active agent such as sorbitan ester or a sucrose ester is used in the reverse-phase suspension polymerization of a water-soluble monomer,spherical polymer particles are stably produced.

In constant, non-spherical agglomerated polymer particles are stably produced by the process of the present invention, as described above. With respect to the agglomerates, small primary particles having particle sizes of 5 to 100 μm are not simply adhered to one another, but completely fused and integrated to become granular particles. It is noteworthy that the agglomeration of primary particles proceeds only in the polymerization stage, and does not proceed during the period after the completion of polymerization until the completion of dehydration. In view of these facts, it is considered that the phosphoric ester surface active agent performs two different functions; that is, for monomer droplets, and for polymer particles having low polymerization degrees at the initial stage of polymerization, the surface active agent acts so that they will become unstable and cause agglomeration; whereas for secondary polymer particles formed with the agglomeration of primary particles, the surface active agent acts so that they can remain in the stably dispersed state.

The highly water-absorptive polymer according to the present invention can be obtained as a final product by drying, by using a vacuum drier or the like, the polymerization product as it is or after removing therefrom the solvent by means of decantation or centrifugal separation. Further, it is also possible to subject the polymer, if necessary, to crushing, granulation or the like, thereby obtaining polymer particles having desired particle sizes.

EXAMPLES

The following examples illustrate the present invention but are not intended to limit it.

The evaluation methods employed in the examples are as follows.

(1) Water Absorption Capacity

Approximately 0.5 g of a water-absorptive polymer was accurately weighed [w(g)], and placed in a 250-mesh nylon bag (size: 20 cm×10 cm). The weight [Wo(g)] of the containing the polymer was measured. The bag was immersed in 500 cc of artificial urine for 30 minutes, and then pulled out. The bag was drained for 15 minutes, and weighed [W(g)]. The water absorption capacity of the water-absorptive polymer was determined by the following equation:

$$\text{Water absorption capacity (g/g)} = (W-Wo)/W$$

The composition of the artificial urine was as follows:

| | |
|---|---|
| Urea | 1.94% |
| Sodium chloride | 0.80% |
| Potassium chloride | 0.06% |
| Magnesium sulfate | 0.11% |
| Pure water | 97.09% |

(2) Speed of Water Absorption

Figure 4:
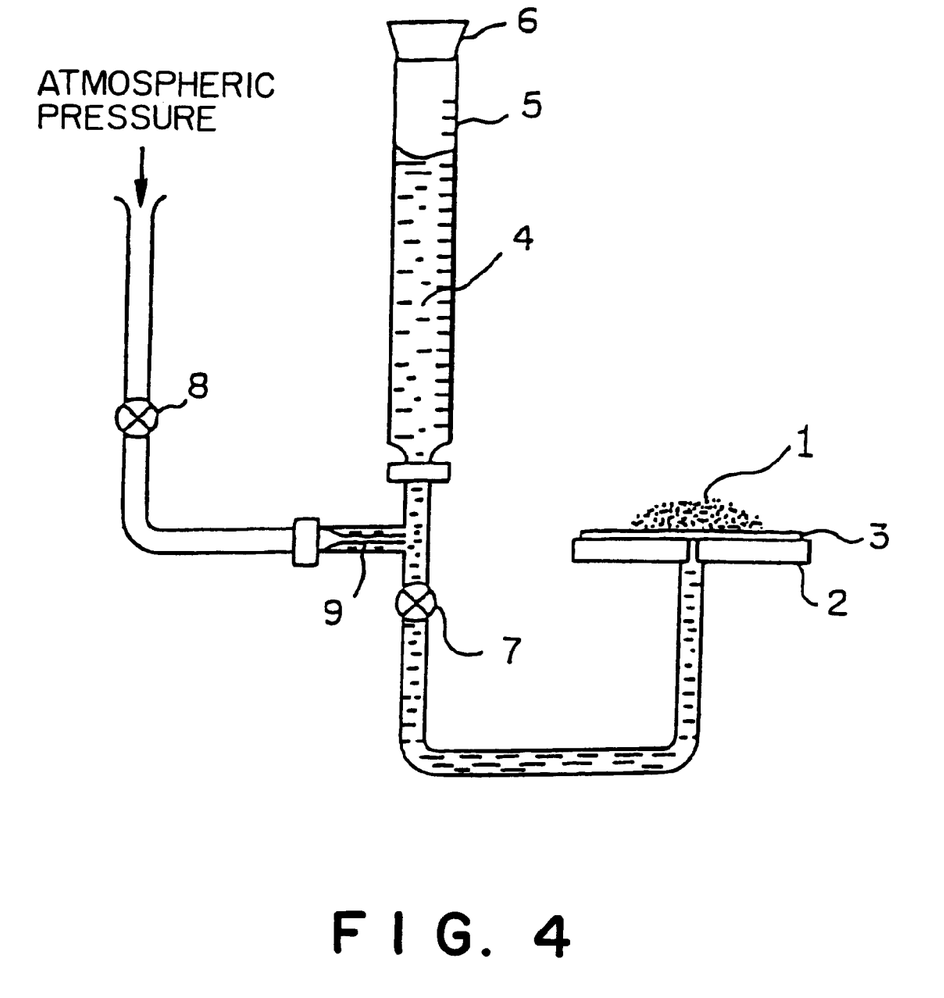
FIG. 4 is a diagrammatic view of an apparatus to be used for measuring the speed of water absorption of highly water-absorptive polymers.

Measured by using the apparatus shown in FIG. 4. 1.0 g of a highly water-absorptive polymer 1 was put on a nonwoven sheet 3 placed on a supporting plate 2 having a small hole. The polymer was brought into contact with 0.9% physiological saline 4, and the amount of the saline absorbed by the polymer was measured. The amount of the 0.9% physiological saline absorbed by the polymer during the initial 20-minute period was taken as the speed of water absorption.

In FIG. 4, the reference numerals not referred to above denote the following: 5 burette; 6 rubber stopper; 7, 8 valve; 9 air inlet.

(3) Average Particle Size and Particle Size Distribution

ASTM standard sheaves of 8 mesh, 12 mesh, 20 mesh, 24 mesh, 32 mesh, 40 mesh, 60 mesh, 80 mesh, 100 mesh and 120 mesh, and a receiving dish were assembled in the mentioned order. Approximately 50 g of a water-absorptive polymer was placed on the uppermost sheave, and the assembly was shaken by means of a ro-tap automatic shaker for 1 minute. The percentage R of the residual polymer was plotted on logarithmico-normal probability paper, and the particle size corresponding to R=50% was taken as the average particle size.

With respect to the particle size distribution, the logarithmic standard deviation A shown by the following equation was used as an index for it (see "Funtai Kogaku no Kiso", edited by *Funtai Kogaku no Kiso Henshu Iin-Kai*, published by The Nikkan Kogyo Shimbun, Ltd., Japan), wherein the smaller is the value A, the narrower is the particle size distribution.

$$A = \{ln(d_2/d_1)\} \times 0.5$$

where $d_1$ is the particle size when R is 84.1%, and $d_2$ is the particle size when R is 15.9%.

(4) Bulk Density

Measured in accordance with JIS K-6721. Measurement was repeated three times, and the average value was taken as the bulk density.

(5) Gel Retention 2.5 g of a water-absorptive polymer was uniformly sprinkled on a fluffy pulp sheet (basis weight: 150 g/m², size:19 cm×7.5 cm). On this composite of the water-absorptive polymer/fluffy pulp sheet, a fluffy pulp sheet of the same size and basis weight as those of the above fluffy pulp sheet was superposed to obtain a simple water-absorptive pad. This water-absorptive pad was compressed by using a hydraulic press at room temperature under a load of 100 kg for 20 minutes, and then allowed to absorb 125 g of 0.9% physiological saline.

A 3.5 -kg iron weight was placed on the pad, which was then shaken by means of a shaker (model "MS-1" manufactured by Iuchi Seieido K.K., Japan) in the direction horizontal to the pad for 3 minutes (the number of shaking: 100 times/min.).

The weight was taken away, and those gels which were remaining inside the pad, and those gels which had come out from the pad by shaking were separately collected and weighed. The gel retention was determined by the following equation:

$$\text{Gel retention } (\%) = \frac{\text{gel (g) inside the pad}}{\text{gel (g) outside the pad} + \text{gel (g) inside the pad}} \times 100$$

(6) Phosphorus Content

About 2g of a highly water-absorptive polymer was weighed and placed in a Kjeldahl flask. 10 ml of sulfuric acid and 3 ml of nitric acid were added to the polymer, and the mixture was heated on an electric heater to decompose the polymer. To the thus obtained decomposed product was added 50 ml of deionized water to prepare a test solution. The test solution was subjected to ICP (inductivity coupled plasma) spectroscopy to determine the phosphorus content.

EXAMPLE 1

207.7 g of acrylic acid was diluted with 13.5 g of water. This solution was neutralized with 346.2 g of a 25 wt. % aqueous solution of sodium hydroxide with cooling. 0.863 g of potassium persulfate was added to and dissolved in the neutralized solution to obtain a uniform solution. A monomer/initiator solution was thus prepared.

Separately, in a 3 litter four-necked round flask equipped with a stirrer, a reflux condenser, a thermometer and a nitrogen gas inlet tube, 624 g of cyclohexane was placed. To this, 1.56 g of polyoxyethylene tridecyl ether phosphate ("Plysurf A212C" manufactured by Dai-Ichi Kogyo Seiyaku Co., Ltd., Japan) was added as a dispersant, and the mixture was stirred (500 rpm) to obtain a dispersion. The air inside the flask was replaced with nitrogen, and the temperature of the dispersion was then raised to 75° C. for the reflux of cyclohexane. To the system was added dropwise the above-prepared monomer/initiator solution over a period of 46 minutes. After the addition was completed, the system was maintained at 75° C. for 30 minutes. Thereafter, the system was further heated for carrying out azeotropic distillation with cyclohexane to dehydrate the resulting polymer to the water content of 7% by weight.

Upon the completion of dehydration, the stirring was stopped. The polymer particles settled on the bottom of the flask, so that it was quite easy to separate them by means of decantation. The separated polymer was heated at 90° C. to remove cyclohexane and a small amount of water remaining on the polymer. The dried polymer particles obtained were botryoidal particles having such a structure that primary particles having particle sizes of 5 to 50 μm were fused to one another. The weight of the dried polymer was 255 g, and the amount of the polymer that had adhered to the wall of the flask and to the stirrer was approximately 40 g.

EXAMPLE 2

Botryoidal polymer particles were obtained by the same procedure as in Example 1, except that polyoxyethylene dinonylphenyl ether phosphate ("Plysurf A207H" manufactured by Dai-Ichi Kogyo Seiyaku Co., Ltd., Japan) was used as a dispersant. The weight of the dried polymer was 271 g, and the amount of the polymer that had adhered to the wall of the flask and to the stirrer was approximately 22 g.

EXAMPLE 3

Rock-like polymer particles were obtained by the same procedure as in Example 1, except that polyoxyethylene octylphenyl ether phosphate ("Plysurf A210G" manufactured by Dai-Ichi Kogyo Seiyaku Co., Ltd., Japan) was used as a dispersant. The weight of the dried polymer was 275 g, and the amount of the polymer that had adhered to the wall of the flask and to the stirrer was approximately 13 g.

EXAMPLE 4

Rock-like polymer particles were obtained by the same procedure as in Example 3, except that the amount of the potassium persulfate used was changed to 0.218 g. The weight of the dried polymer was 265 g, and the amount of the polymer that had adhered to the wall of the flask and to the stirrer was approximately 21 g.

EXAMPLE 5

Rice-grain-like polymer particles were obtained by the same procedure as in Example 4, except that the number of revolutions for stirring during polymerization was changed to 300 rpm. The weight of the dried polymer was 260 g, and the amount of the polymer that had adhered to the wall of the flask and to the stirrer was approximately 28 g.

EXAMPLE 6

Botryoidal polymer particles were obtained by the same procedure as in Example 1, except that polyoxyethylene-Dobanol 25-phosphate ("Plysurf A208S" manufactured by Dai-Ichi Kogyo Seiyaku Co., Ltd., Japan) was used as a dispersant. The weight of the dried polymer was 257 g, and the amount of the polymer that had adhered to the wall of the flask and to the stirrer was approximately 27 g.

EXAMPLE 7

Botryoidal polymer particles were obtained by the same procedure as in Example 1, except that polyoxyethylene distyrenated phenyl ether phosphate ("Plysurf AL" manufactured by Dai-Ichi Kogyo Seiyaku Co., Ltd., Japan) was used as a dispersant. The weight of the dried polymer was 260 g, and the amount of the polymer that had adhered to the wall of the flask and to the stirrer was approximately 22 g.

EXAMPLE 8

Botryoidal polymer particles were obtained by the same procedure as in Example 1, except that 0.117 g of ethylene glycol diglycidyl ether was added, as a crosslinking agent, to the monomer. The weight of the dried polymer was 250 g, and the amount of the polymer that had adhered to the wall of the flask and to the stirrer was approximately 53 g.

EXAMPLE 9

Botryoidal polymer particles were obtained by the same procedure as in Example 6, except that the amount of the potassium persulfate used was changed to 0.218 g. The weight of the dried polymer was 245 g, and the amount of the polymer that had adhered to the wall of the flask and to the stirrer was approximately 52 g.

Comparative Example 1

Experiment was carried out by using the dispersant described in Japanese Patent Laid-Open Publication No. 209201/1986. Thus, polymerization was carried out by the same procedure as in Example 1, except that monolauryl phosphate was used as a dispersant. The polymer began to adhere to the wall of the flask at the initial stage of polymerization. Approximately 30 minutes after the initiation of the dropping of the monomer solution, the polymer wound around the stirrer, and it became very dangerous. Therefore, the polymerization operation was stopped. The amount of the polymer that had adhered to the wall of the flask and to the stirrer was not less than 500 g.

Comparative Example 2

Experiment was carried out by using the dispersant described in Japanese Patent Laid-Open Publication No. 93008/1994. Thus, granular polymer particles were obtained by the same procedure as in Example 1, except that sodium polyoxyethylene lauryl ether sulfate ("Nikkol SBL-2N-27" manufactured by Nikko Chemicals Co., Ltd., Japan, containing 27% of the active component) was used as a dispersant in an amount of 5.78 g (amount of the active component: 1.56 g). Twenty minutes after the initiation of the dropping of the monomer solution, the polymer began to adhere to the wall of the flask. The polymer adhesion to the wall of the flask was observed also in the dehydration stage. The weight of the dried polymer was 176 g, and the amount of the polymer that had adhered to the wall of the flask and to the stirrer was approximately 119 g.

Comparative Example 3

Spherical polymer particles were obtained by the same procedure as in Example 1, except that sorbitan monostearate was used as a dispersant. The weight of the dried polymer was 235 g, and the amount of the polymer that had adhered to the wall of the flask and to the stirrer was approximately 60 g.

Comparative Example 4

Spherical polymer particles were obtained by the same procedure as in Example 1, except that hydroxyethylcellulose was used as a dispersant. The weight of the dried polymer was 200 g, and the amount of the polymer that had adhered to the wall of the flask and to the stirrer was approximately 100 g.

Comparative Example 5

One-feed polymerization was carried out in accordance with the method described in Japanese Patent Laid-Open Publication No. 157513/1986, by using the same laboratory equipments and reagents as in Example 1.

Thus, 624 g of cyclohexane was placed in the same four-necked round flask. To this was added 1.56 g of polyoxyethylene tridecyl ether phosphate ("Plysurf A212C") as a dispersant. The mixture was stirred (500 rpm) to obtain a dispersant/cyclohexane dispersion, and the air inside the flask was replaced with nitrogen at 20° C. In parallel, 207.7 g of acrylic acid was placed in another vessel, and diluted with 13.5 g of water. This solution was neutralized with 346.2 g of a 25wt. % aqueous solution of sodium hydroxide with cooling. 0.863 g of potassium persulfate was added to and dissolved in the neutralized solution to obtain a uniform monomer/dispersant solution.

The monomer/dispersant solution was introduced into the above-prepared cyclohexane/dispersant solution from the top of the reactor. The mixture was stirred for 15 minutes, and then the temperature of the mixture was raised at a rate of 70° C./hr. When the temperature inside the reactor reached 60° C., polymerization suddenly took place, and the polymer wound around the stirring rod. It became dangerous, so that the polymerization operation was stopped. The amount of the polymer that had adhered to the wall of the reactor and to the stirrer was not less than 500 g.

The above-obtained polymers were evaluated in terms of average particle size, the percentage of fine particles, particle size distribution, bulk density, phosphorus content, water absorption capacity, the speed of water absorption, and the gel retention. The results are shown in Table 1.

TABLE 1

|  | Polymer buildup (g) | Average Particle size (μm) | Percentage of fine particles of 80 mesh or smaller (%) | Particle size distribution A | Bulk density (g/ml) | Phosphorus Content (ppm) | Artificial urine absorption capacity (g/g polymer) | Speed of water absorption (g/g polymer) | Gel retention (%) |
|---|---|---|---|---|---|---|---|---|---|
| Ex. 1 | 40 | 330 | 1 | 0.26 | 0.57 | 28 | 38 | 23 | 72 |
| Ex. 2 | 22 | 625 | 0 | 0.3 | 0.52 | 22 | 37 | 25 | 72 |
| Ex. 3 | 13 | 935 | 0 | 0.3 | 0.41 | 25 | 38 | 26 | 82 |
| Ex. 4 | 21 | 790 | 0 | 0.34 | 0.79 | 23 | 39 | 18 | 70 |
| Ex. 5 | 28 | 620 | 0 | 0.31 | 0.68 | 26 | 39 | 21 | 67 |
| Ex. 6 | 27 | 735 | 0 | 0.34 | 0.47 | 28 | 38 | 23 | 77 |
| Ex. 7 | 22 | 870 | 0 | 0.32 | 0.42 | 32 | 37 | 23 | 78 |
| Ex. 8 | 53 | 330 | 1 | 0.27 | 0.59 | 35 | 35 | 42 | 78 |
| Ex. 9 | 52 | 315 | 1 | 0.26 | 0.56 | 30 | 36 | 43 | 75 |
| Comp. Ex. 1 | >500 | | | | | | | | |
| Comp. Ex. 2 | 119 | 675 | 1 | 0.32 | 0.52 | — | 37 | 8 | 75 |
| Comp. Ex. 3 | 60 | 110 | 62 | 0.4 | 0.97 | — | 36 | 25 | 12 |
| Comp. Ex. 4 | 100 | 260 | 32 | 0.38 | 0.95 | — | 37 | 12 | 25 |
| Comp. Ex. 5 | >500 | | | | | | | | |

The date shown in the above Table 1 (Examples 1 to 9 vs. Comparative Examples 1 to 5) clearly demonstrates that it is possible to safely and easily carry out polymerization without suffering from a remarkable adhesion of a polymer to equipments, according to the process of the present invention in which the specific phosphate dispersant is used and the polymerization is conducted by the dropping polymerization method.

The highly water-absorptive polymers obtained by the process of the present invention have large average particle sizes, narrow particle size distributions, high bulk densities, and high speeds of water absorption.

Further, the highly water-absorptive polymers obtained by the process of the present invention are granular polymers in which primary particles are integrated by fusion. Such polymers never return to primary particles even after they absorbed water, and remain in the granular state. The gels therefore show excellent retention in a sanitary article.

What is claimed is:

1. A highly water-absorptive polymer comprising crosslinked non-spherical polymer particles, the polymer particles comprising the monomer unit of acrylic acid and/or an alkaline metal salt thereof, and having an average particle size of 300 to 1,000 μm and a bulk density of 0.3 to 0.9 g/ml, the logarithmic standard deviation of the particle sizes of the polymer particles being 0.35 or less.

2. The highly water-absorptive polymer according to claim 1, wherein the polymer particles contain phosphorus atoms.

3. A process for producing a highly water-absorptive polymer, which comprises suspending an aqueous solution containing a water-soluble polymerizable monomer and an optional crosslinking agent into droplets in a hydrophobic organic solvent in the presence of a dispersant and a water-soluble radical polymerization initiator, and allowing the water-soluble polymerizable monomer to polymerize in the droplets, wherein the dispersant is a phosphoric ester surface active agent represented by the following general formula [I]:

wherein $R^1$ represents an alkyl or alkylaryl group having 8 to 30 carbon atoms, $R^2$ represents OH group or a group of the formula $-(CH_2CH_2O)_m-OR^1$, and m and n are an integer of 1 to 30, and the aqueous solution is successively fed to the hydrophobic organic solvent so that the droplets of different polymerization degrees can be present in the solvent.

4. The process for producing a highly water-absorptive polymer according to claim 3, wherein the water-soluble polymerizable monomer is acrylic acid or an alkaline metal salt thereof.

* * * * *